United States Patent [19]

Fredd et al.

[11] E Re. 31,313

[45] Reissued Jul. 19, 1983

[54] METHOD AND SYSTEM FOR WELL TESTING

[75] Inventors: John V. Fredd; Phillip S. Sizer, both of Dallas, Tex.

[73] Assignee: Otis Engineering Corporation, Dallas, Tex.

[21] Appl. No.: 311,638

[22] Filed: Oct. 15, 1981

Related U.S. Patent Documents

Reissue of:

[64] Patent No.: 4,274,485
Issued: Jun. 23, 1981
Appl. No.: 78,712
Filed: Sep. 25, 1979

[51] Int. Cl.[3] ..... E21B 34/14; E21B 43/12; E21B 47/00; F16K 31/44

[52] U.S. Cl. ..... 166/250; 166/264; 166/332; 166/373; 166/386; 251/291; 251/321

[58] Field of Search ..... 166/332, 72, 333, 334, 166/250, 264, 325, 373, 386; 73/155; 251/241, 321

[56] References Cited

U.S. PATENT DOCUMENTS

| | | | |
|---|---|---|---|
| Re. 29,471 | 11/1977 | Giroux | 166/334 |
| 2,344,121 | 3/1944 | Bassinger | 166/333 |
| 2,790,501 | 4/1957 | Garrett et al. | 166/332 |
| 3,185,219 | 5/1965 | Grimmer et al. | 251/291 X |
| 3,552,718 | 1/1971 | Schwegman | 251/291 |
| 4,083,401 | 4/1978 | Rankin | 166/250 |
| 4,113,012 | 9/1978 | Evans et al. | 166/264 |
| 4,149,593 | 4/1979 | Gazda et al. | 166/334 X |
| 4,159,643 | 7/1979 | Watkins | 73/155 |

*Primary Examiner*—Stephen J. Novosad
*Attorney, Agent, or Firm*—Vinson & Elkins

[57] ABSTRACT

A well testing system and method in which a by-pass valve is positioned in the tubing and a probe run on a line from the surface opens and closes the valve with vertical movement of the probe. The probe when landed in the valve is exposed to formation fluids and may transmit back to the surface, or may record information about the formation. The probe may also collect a sample of fluid to return to the surface with the probe.

17 Claims, 4 Drawing Figures

METHOD AND SYSTEM FOR WELL TESTING

Matter enclosed in heavy brackets [ ] appears in the original patent but forms no part of this reissue specification; matter printed in italics indicates the additions made by reissue.

This invention relates to method and apparatus for testing wells. It is desirable to be able to test a petroleum formation under both static and flowing conditions. Equipment has been proposed for testing under static conditions. See Kingelin U.S. Pat. Nos. 4,051,897 and 4,134,452.

It has also been proposed to be able to open and close a valve controlling flow from the formation in such a test program. See Nix U.S. Pat. No. 4,047,564.

So far as is known the prior art does not teach a simple wireline retrievable by-pass valve which can be landed in a well tubing together with an operating probe which can be manipulated to open and close a by-pass valve and which can either collect data or samples or can transmit data to the surface over a conventional electric line.

It is an object of this invention to provide a method and apparatus in which a by-pass valve in a well string may be opened and closed by reciprocating a probe landed in the by-pass valve, which probe is exposed to formation pressure at all times, and in which unseating of the probe returns the by-pass valve to its original condition.

Another object is to provide a method and system as in the preceding object in which the by-pass valve can be run in the well and seated in a landing nipple using conventional locking mandrel techniques.

Another object is to provide a method of operation and a by-pass valve which is preferably normally open in which a probe can be landed and the valve opened and closed by reciprocation of the probe and in which the probe is released from the by-pass valve by an upward pull on the probe.

Another object is to provide a method of operation as in the preceding object in which pressure across the probe can be equalized prior to releasing the probe.

Another object is to provide a by-pass valve which is reciprocal between open and closed positions by a shifting means and in which the shifting means can be released by pulling on the shifting means with more force than necessary to move the valve between its open and closed positions.

Another object is to provide a by-pass valve in which the valve is shifted between open and closed positions by a plunger and in which a shifting means is releasably attached to the plunger and can be released by pulling the plunger beyond the point at which the valve is moved between its open and closed positions.

Another object is to provide a valve as in the preceding object with a shutter which protects the seals sealing between the flowway through the valve and an operating plunger, which shutter controls flow through the plunger flowway.

Other objects, features and advantages of the invention will be apparent from the specification, the drawings and the claims.

In the drawings wherein like reference numerals indicate like parts and wherein an illustrative embodiment of this invention is shown:

Figure 1:
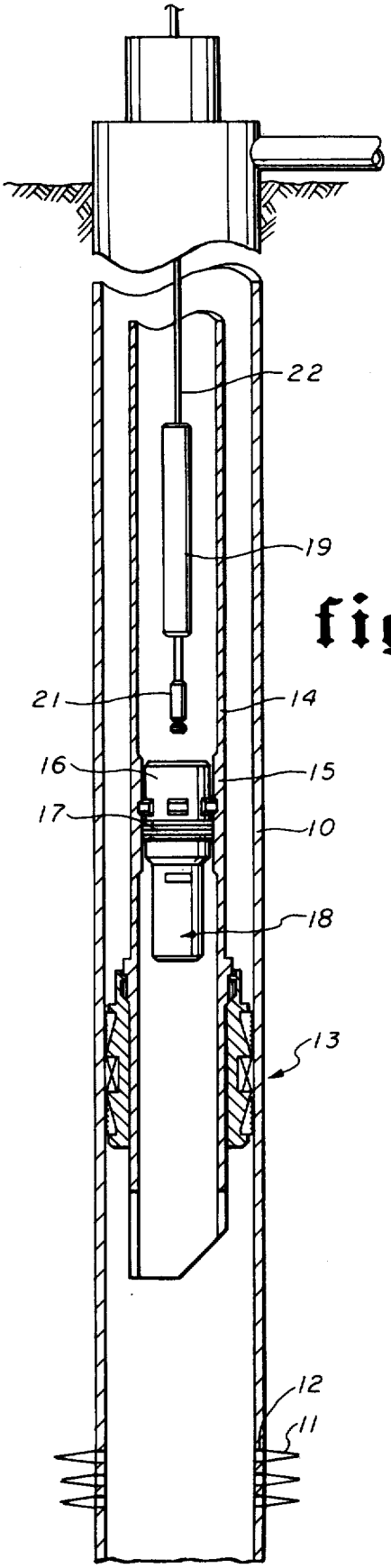
FIG. 1 is a schematic illustration partially in cross-section and partially in elevation of a well with the transducer fitting or by-pass valve in place and showing the operating plunger being moved through the tubing on an electric line.

Referring first to FIG. 1, the well has a casing 10 which is in communication with the formation 11 through perforations 12 in the casing.

A conventional packer 13 which is preferably of the wireline type has been run in and landed and set in the casing above the formation 11. If desired, the packer could be run on the tubing in the conventional manner. Using the wireline run packer 13 the tubing 14 is stabbed into the packer 13 and seals therewith through suitable annular seals (not shown) between the lower end or tailpipe of the tubing and the packer.

The tubing 14 has a conventional hanger nipple 15 therein. A conventional locking mandrel 16 is landed in the nipple 15 and conventional packing 17 seals between the locking mandrel 16 and the landing nipple 15.

Depending from the locking mandrel is the transducer fitting or by-pass valve 18.

Shown above the locking mandrel is the probe 19 having a fitting 21 at its lower extremity for engaging and latching to the by-pass valve 18. The probe 19 is suspended in the well on a suitable electric line 22 which is controlled from the surface. If the probe is not sufficiently heavy to carry out the operations to be disclosed hereinafter, sufficient weights can be attached to the probe to provide the desired downward force.

In accordance with the method of this invention the transducer 18 is either landed in the well by wireline or run in with the tubing, it being understood that instead of using the landing nipple and locking mandrel the transducer could be provided in a joint in the tubing and run in with the tubing.

In either event, the probe 19 is run into the well and manipulated vertically to land in the by-pass valve 18 and open and close this valve with vertical movement of the probe 19. While the valve is open the well is produced through the by-pass valve to obtain information about the formation. While the probe may also be transmitting information about the formation during this time, it is desirable that information be obtained during shut-in conditions and for this purpose the valve is closed with the probe in place and the probe is exposed to formation fluids with the well shut-in to either record or transmit to the surface information such as the build-up pressure curve for the formation. The probe is then released from the by-pass valve and retrieved from the wall. Preferably, when the by-pass valve is to be run into the well, the valve is normally in the open position and when the probe 19 releases from the valve it results in the valve automatically returning to the open position. With the valve in the open position, the transducer valve can readily be run into and removed from the well by wireline procedures as there will be little or no differential across the packing 17 while the locking mandrel is being landed or retrieved. Further, there is no hydraulic lock or resistance to landing and retrieving the probe 19.

Figure 2:
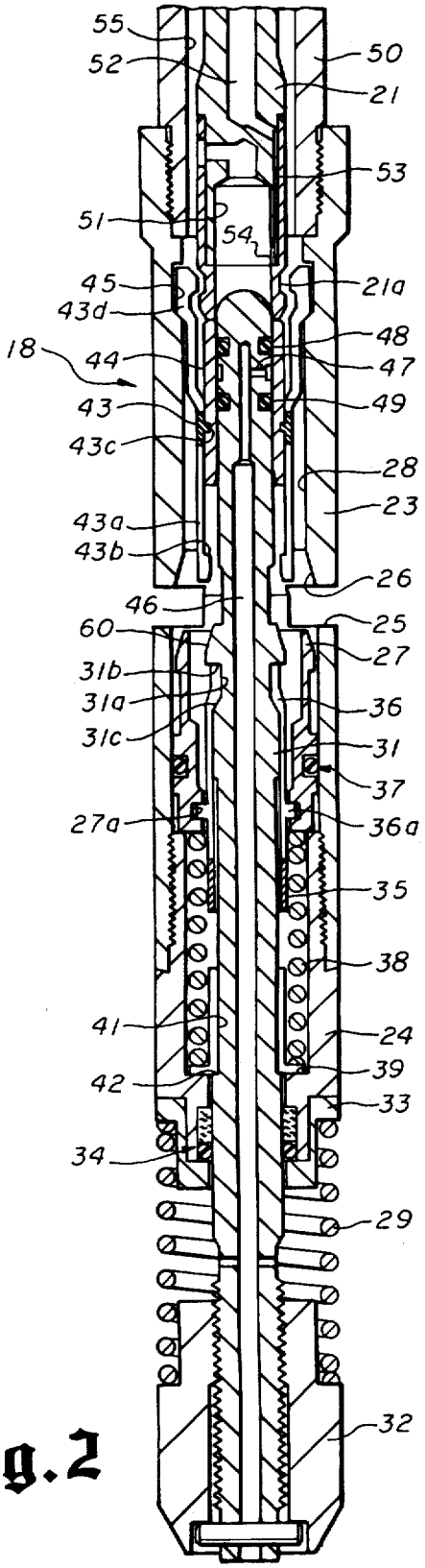
FIG. 2 is a view in cross-section of the by-pass valve of this invention with the lower end of the operating plunger in engagement with the valve but not attached thereto.

Reference is now made to FIG. 2 which shows the preferred form of by-pass valve 18.

The valve includes a body made up of upper and lower body sections 23 and 24, respectively. The upper body 23 is slotted at 25 and a valve seat 26 is provided in the body 23 above the slot 25.

A valve member 27 is provided which cooperates with the seat and controls flow through the bore 28 in the upper valve body section 23.

The valve member 27 is preferably urged to one of its open or closed positions, and more preferably to its open position so that the valve may be readily run into and landed in the well by wireline procedures. This resilient means is provided by spring 29, which is held in compression and constantly urges the valve member 27 toward its open position.

Figure 4:
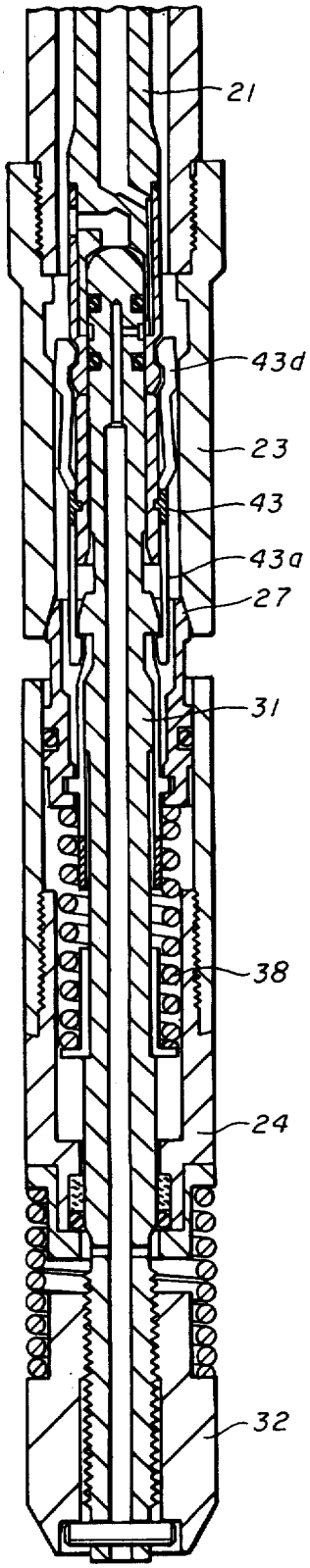
FIG. 4 is a view similar to FIGS. 2 and 3 with the plunger in engagement with the by-pass valve and raised to position the by-pass valve in its closed position.

A plunger 31 is provided in the valve and reciprocates and moves with the valve member between valve open and valve closed position. As will appear hereinbelow, force is transmitted from the spring 29 through the plunger 31 to the valve member 27 and the spring 29 constantly urges the plunger 31 downwardly to maintain the valve in open position. When the plunger is raised the spring 29 is compressed and the valve moves to its closed position, as shown in FIG. 4. A suitable cap 32 is provided on the lower end of the plunger 31 and the spring 29 is held between the cap and a spring guide 33 on the lower end of the lower body portion 24.

To provide for fluid tight integrity when the valve is closed a suitable seal indicated at 34 is provided between the lower body section 24 and the plunger 31.

The plunger 31 is connected to the valve member 27 by a connecting means which provides for movement of the plunger and valve together as the valve moves between open and closed positions. It also provides for a movement of the plunger after the valve member has reached one of its open and closed positions, preferably the closed position. This additional movement provides an automatic release for a shifting means such as a shifting collet as will appear hereinafter. This connecting means includes a collet 35 which has a plurality of collet fingers 36 surrounding the plunger 31. The collet fingers also include flange portions 36a which extend outwardly from the collet and engage within an inwardly facing circumferential groove 27a within the valve member 27. The collet 35 connects the valve member 27 to the plunger 31 so that the plunger and the valve member reciprocate with each other. Thus, the spring 29 acts through this connecting means to urge the valve to open position and raising of the plunger moves the valve 27 to closed position in which it is in engagement with seat 26.

To provide for fluid integrity of the system when the valve 27 is closed, a suitable seal indicated generally at 37 is provided on the exterior of the valve member to slidably seal with the body section 23 below the seat 26. Thus, when the valve 27 is seated the seals 34 and 37 provide for fluid tight integrity through the bore 28 of the upper body section 23.

The release collet 35 has the upper ends of the collet fingers 36 residing in an external groove 31a on the plunger 31. This groove provides a downwardly facing shoulder 31b and an upwardly facing inclined surface 31c. The collet fingers 36 are contoured on their inner surfaces to be a mirror image of the groove 31a and as shown in FIG. 2 fit snugly within the groove in their unstressed condition.

The connecting means between the valve 27 and the plunger 31 is such that the plunger can continue to move after the valve has moved to one of its fully open or closed positions, preferably fully closed position. To provide for such continued motion a second resilient means is provided by the spring 38 which bears against the lower end of valve member 27 and against an upwardly facing shoulder 39 in the lower body section 24 through a spring guide 41. The spring guide 41 has an out-turned lip that bears on shoulder 39 in the housing. The spring guide 41 also bears on an upwardly facing shoulder 42 on the plunger 31. The spring 38 is in compression but the engagement of the upper ends of the release collet fingers 36 with the downwardly facing shoulder 31b on the plunger 31 prevent the spring from urging the valve upwardly. In other words, the spring is essentially held in compression between the downwardly facing shoulder 31b on the plunger and the upwardly facing shoulder 42 on the plunger.

This release collet assembly just explained provides for release of a pulling collet bearing against the downwardly facing shoulder 31b. Thus, if a collet be attached to the plunger and engages the downwardly facing shoulder 31b and an upward pull be placed on the pulling collet to carry the plunger upwardly beyond the point at which the valve 27 seats on seat 26, the pulling collect will be released. As the plunger 31 continues to move up, the inclined shoulder 31c on the plunger rides under the collet fingers 36 forcing them outwardly to disengage the pulling collet from the shoulder 31b. The spring 38 permits this upward movement of the plunger relative to the valve member after the valve member is seated and as soon as the upward pressure is removed from the plunger 31 the spring 38 returns the plunger and valve member and collet 35 to the relationship shown in the drawings.

Figure 3:
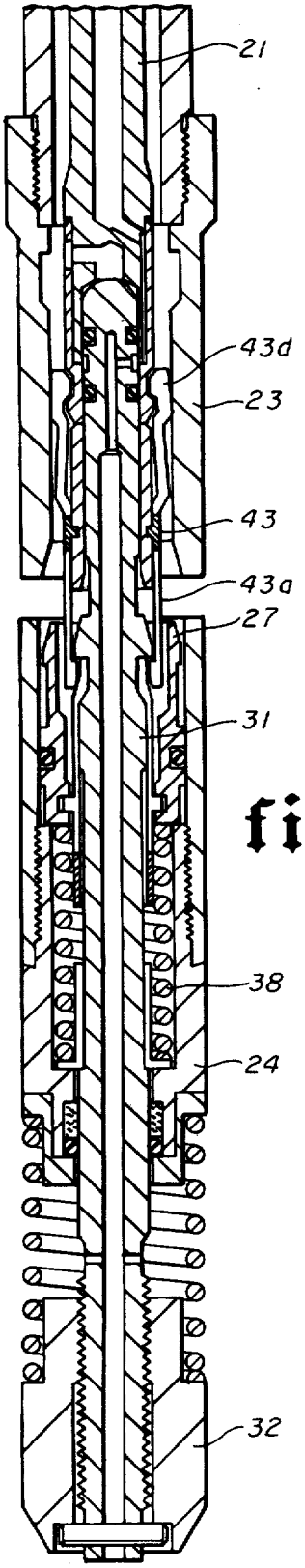
FIG. 3 is a view similar to FIG. 2 showing the plunger to be in engagement with the by-pass valve and the by-pass valve to be in open position.

A pulling collet is provided either on the probe 19 or as a part of the valve 18. Preferably, it is a part of the valve 18 and is provided by the double collet 43. The collet 43 has the downwardly extending collet fingers 43a, each of which carries an upwardly facing shoulder 43b for engaging the downwardly looking shoulder 31b on the plunger 31. The engaged position is shown in FIG. 3 with the valve in the open position. The same relationship is shown in FIG. 4 with the valve closed. The collet 43 has an internal annular flange 43c which engages in a groove in the shutter-valve member 44 so that as the pulling collet 43 reciprocates within the valve the shutter 44 reciprocates with the pulling collet.

To engage and latch the probe 19 to the by-pass valve the pulling collet 43 is provided with upwardly extending collet fingers 43d. These fingers reside within the groove 45 within the upper body 23 when the pulling collet is in its upper position. The bore 28 provides a land below the groove 45 and thus when the pulling collet moves downwardly, the upwardly extending collet fingers 43d are cammed inwardly. These fingers then engage within the groove 21a of the latch fitting 21 and latch the probe to the pulling collet and thus to the valve 18.

In accordance with this invention means are provided for establishing fluid communication between the probe 19 and the formation, particularly when the valve 18 is closed; although in accordance with the disclosure of the preferred form, this communication is present with the valve in open or closed position.

The plunger 31 has extending therethrough a flowway 46 which extends to the bottom extremity of the plunger. The flowway communicates with a side port 47 in the upper end of the plunger 31. Suitable seals 48 and 49 are carried on the probe and straddle the port 47. The shutter valve member 44, which is carried by the pulling collet 43, reciprocates on the upper end of the plunger and when in the upper position shown is in contact with both seals 48 and 49 to close the passageway 46 through the plunger and prevent flow therethrough. When the pulling collet is moved to its down position, as shown in FIGS. 3 and 4, the shutter-valve member 44 uncovers the upper seals 48 and 49 to permit flow through the flowway 46.

The latch fitting 21 is provided at its lower end with a bore 51 which receives the upper end of the plunger 31, as shown in FIGS. 3 and 4. This bore 51 communicates with the exterior of the connector to avoid a fluid lock. The latch fitting 21 is provided with a flowway 52 to conduct fluid upwardly to the transducer within the probe 19. The flowway 52 connects with a small passageway 53, which terminates at the inwardly facing port 54. The port 54 overlies the port 47 in the plunger 31 when the probe is in engagement and attached to the by-pass valve.

In operation the wireline packer 13 will be run and set in the hole. The tubing 14 will then be run and landed in the packer 13. The locking mandrel 16 with its associated transducer fitting-by-pass valve 18 may be run in place in the tubing or it may be run after the tubing has been landed, utilizing conventional wireline techniques.

In any event with the by-pass valve 18 in place the probe 19 is run on an electric line 22 and the latch fitting 21 of the probe will move into engagement with the upper end of the plunger 31, as illustrated in FIG. 2. The line is slacked off and the weight of the probe is exerted against the upper end of the shutter 44. This weight slides the shutter downwardly and cams the upper collets 43 inwardly to engage within the groove 21a on the latch fitting 21. As the lower end of the latch fitting 21 is in abutting engagement with the upper end of the shutter 44, the upper O-rings 48 and 49 will be protected by the shutter as the transition is made in engagement of the seals 48 and 49 from the shutter to the latch fitting 21. Further downward movement of the shutter uncovers the port 47 and places the transducers (not shown) within the probe 19 in communication with the formation through the flowway 52, 53, 46 and 47.

As the pulling collet 43 moves downwardly the lower collect fingers 43 ride over the upwardly facing cam surface 60 on the plunger 31 and snap in behind the downwardly facing shoulder 31b, as shown in FIG. 3. At this time the probe is attached to the by-pass valve and the valve is in position for flowing of the well through the by-pass valve to obtain information about the flowing characteristics of the well.

Flow from the well is through the bore 28 of the upper body and upwardly through the bore in the lower end 50 of the locking mandrel 16. The lower end 50 of the locking mandrel may be a short sub, as illustrated. In any event, the locking mandrel has a bore therethrough which is a continuation of the bore 55 through the sub 50 to convey well fluids through the by-pass valve and to the surface.

When it is desired to shut-in the well and obtain well information, such as a pressure build-up curve, the electric line is raised to place sufficient upward force on the line to raise the probe 19 and the pulling collet 43 upwardly to the position shown in FIG. 4 in which the valve member 27 is seated in seat 26 to prevent flow through the by-pass valve and thus shut-in the formation.

The well may be maintained in shut-in condition with the by-pass valve closed for as long as desired to obtain bottom hole information through the flowway through the probe by the media of the transducers within the probe 19.

Upon completion of testing it is desirable to equalize across the valve to prevent blowing the probe up the hole when the by-pass opens. The well is shut-in at the surface and tension on the line 22 is slacked off to open the valve and equalize pressure across the probe. Then the probe is released from the by-pass valve by an upward pull on the wireline. As an upward pull is exerted the spring 38 is compressed permitting the plunger 31 to move upwardly relative to the release collet 35 to spread the upper collet fingers 36. As these collet fingers spread they force the lower collect fingers 43a of the pulling collet 43 to expand until they release the probe 31. Upon release of the probe the resilient spring 29 returns the valve 27 to open position and as spring 38 expands to its limited length the plunger is returned to the relationship shown in FIG. 2 in which the collet fingers 36 are in engagement with the downwardly facing shoulder 31b on the probe 31.

Upward movement of the release collet 43 moves the upwardly facing collet fingers 43d on collet 43 into the groove 45 where they expand and disengage the latch fitting 21 on the probe 19. As the collet 43 moves upwardly with the latch fitting 21 the shutter valve member 44 moves up to cover O-ring 48 and protect the O-ring as the latch fitting 21 is disengaged.

After the probe is removed from the well the locking mandrel 16 may be removed with conventional wireline techniques and thereafter further operations of conventional nature may be carried out in the well.

The foregoing disclosure and description of the invention are illustrative and explanatory thereof and various changes in the size, shape and materials, as well as in the details of the illustrated construction, and various changes in the process may be made within the scope of the appended claims without departing from the spirit of the invention.

What is claimed is:

1. A valve comprising, a valve body having a seat therein, a valve member cooperable with said seat and controlling flow through the valve body, first resilient means urging said valve member to one of open and closed positions, a plunger connected to said valve member and moving with the valve member between open and closed positions, said connection between the plunger and valve member providing for movement of said plunger relative to the valve member after the valve member reaches the other of said open and closed positions, second resilient means opposing relative movement between the plunger and valve member, pulling means releasably latching onto said plunger, and latch release means releasing said pulling means from said plunger upon movement of said plunger a selected distance in a direction toward said other position after said valve member has moved to said other position.

2. The valve of claim 1 wherein said plunger has a flowway therethrough by-passing said valve seat.

3. The valve of claim 1 wherein said plunger has a flowway therethrough by-passing said valve seat and opening into the side wall of said plunger at its upper end, seal means straddling said flowway opening, and said pulling means carries a shutter protecting said seal means.

4. The valve of claim 1 wherein said plunger has a flowway therethrough by-passing said valve seat and opening into the side wall of said plunger at its upper end, seal means straddling said flowway opening, said pulling means carries a shutter protecting said seal means, and inwardly facing dogs on said pulling means which latch on to a probe when the probe pushes said pulling means downwardly.

5. A valve comprising, a valve body having a seat therein, a valve member cooperable with said seat and controlling flow through the valve body, first resilient means urging said valve member to one of open and closed positions, a plunger connected to said valve member and moving with the valve member between open and closed positions, an annular groove in the external wall of the plunger providing an upwardly facing inclined surface and a downwardly facing stop shoulder, release collet means in said groove and attached to said valve member, and second resilient means urging said release collet toward said stop shoulder and yielding upon continued movement of said plunger a selected distance in a direction toward the other of open and closed positions after said valve member has moved to said other position to permit said release collet means to expand as it moves over said inclined surface.

6. The valve of claim 5 in combination with a pulling collet adapted to engage said stop shoulder and overlie said release collet and to be disengaged from said stop shoulder upon expansion of said release collet.

7. The valve of claims 5 or 6 wherein said plunger has a flowway therethrough by-passing said valve seat.

8. The valve of claim 6 wherein said plunger has a flowway therethrough by-passing said valve seat and opening into the side wall of said plunger at its upper end, seal means straddling said flowway opening, and said pulling collet carries a shutter protecting said seal means.

9. The valve of claim 6 wherein said plunger has a flowway therethrough by-passing said valve seat and opening into the side wall of said plunger at its upper end, seal means straddles said flowway opening, said pulling collet carries a shutter protecting said seal means, and said pulling collet has inwardly facing dogs which latch onto a probe when the probe pushes said pulling collet downwardly.

10. The valve of claims 2, 3, 4, 8 or 9 in combination with a probe releasably landed in said by-pass valve, said probe in fluid communication with said plunger flowway, said valve member reciprocated by raising and lowering said probe, and said probe released from said valve upon upward movement a selected distance beyond that movement required to reach said other position.

11. The valve of claim 5 wherein said plunger has a flowway therethrough by-passing said valve seat, a probe is releasably landed in said by-pass valve, said probe is in fluid communication with said plunger flowway, said valve member reciprocated by raising and lowering said probe, and said probe released from said valve upon upward movement a selected distance beyond that movement required to reach said other position.

12. A well system comprising, a landing nipple, a locking mandrel landed in said nipple, a by-pass valve carried by said locking mandrel, a valve member in said valve, resilient means urging said valve member to one of open or closed positions, a probe, means for releasably latching said probe to said valve member, said valve member moved to the other of open or closed positions by raising of said probe and to said one position by said resilient means upon lowering of said probe, said probe released from said valve upon upward movement a selected distance beyond that movement required to move said valve member to said other position.

13. The method of testing a well having a tubing with a landing nipple and a by-pass valve in said landing nipple comprising, running a transducer probe into the tubing and landing the probe in the by-pass valve, alternately flowing the well and shutting in the well by raising and lowering said probe after it is landed in the valve, determining well conditions while said well is shut-in *and flowing*, and raising said probe a distance beyond that required to move the valve between open and closed positions to release the probe from the valve.

14. The method of claim 13 wherein prior to releasing the probe from the valve the well is shut-in at the surface and the by-pass valve is opened to equalize pressure across the probe.

*15. The method of testing a well having a tubing with a landing nipple and a by-pass valve in said landing nipple comprising,*

*running a transducer probe into the tubing and landing the probe in the by-pass valve,*

*alternately flowing the well and shutting in the well by raising and lowering said probe after it is landed in the valve,*

*determining well conditions while said well is shut-in and flowing.*

*16. The method of claim 15 wherein said conditions are monitored continuously while said probe is engaged in the by-pass valve.*

*17. The method of claim 15 wherein prior to releasing said probe from the by-pass valve, the well is shut-in at the surface and the by-pass valve is opened to equalize pressure across the probe.*

* * * * *